US007219625B2

(12) United States Patent
Powers

(10) Patent No.: US 7,219,625 B2
(45) Date of Patent: May 22, 2007

(54) APPARATUS AND A METHOD FOR RESTRAINING AN ANIMAL DURING WASHING AND/OR GROOMING OF THE ANIMAL

(75) Inventor: Susan Powers, South Elgin, IL (US)

(73) Assignee: Easy Petcare Products, South Elgin, IL (US)

( * ) Notice: Subject to any disclaimer, the term of this patent is extended or adjusted under 35 U.S.C. 154(b) by 0 days.

(21) Appl. No.: 10/741,713

(22) Filed: Dec. 19, 2003

(65) Prior Publication Data

US 2005/0132976 A1 Jun. 23, 2005

(51) Int. Cl.
*A01K 29/00* (2006.01)
(52) U.S. Cl. .................. 119/651; 119/675; 119/673
(58) Field of Classification Search ............. 119/651, 119/753, 756, 671, 676, 675, 673, 479
See application file for complete search history.

(56) References Cited

U.S. PATENT DOCUMENTS

| | | | |
|---|---|---|---|
| 2,435,864 A | 2/1948 | Smith | |
| 2,902,976 A | 9/1959 | Wilson | |
| 3,266,464 A | 8/1966 | Davis | |
| 4,589,546 A * | 5/1986 | Sunderland | 206/315.11 |
| 4,817,191 A * | 3/1989 | Adams | 455/351 |
| 4,836,144 A | 6/1989 | Cole | |
| 5,148,771 A * | 9/1992 | Schuett et al. | 119/479 |
| 5,202,098 A * | 4/1993 | Nichols | 422/300 |
| 5,488,926 A | 2/1996 | Hunt | |
| 5,513,598 A | 5/1996 | Zapparoli | |
| 5,678,511 A | 10/1997 | Day | |
| 5,794,570 A | 8/1998 | Foster et al. | |
| 5,992,673 A * | 11/1999 | Hwang | 220/819 |
| 6,067,745 A * | 5/2000 | Adams et al. | 43/55 |

OTHER PUBLICATIONS

Derwent Publication, Protective hinged lid container for an isopor box has a door handle and drainage holes, Dec. 16, 2003, Derwent, 2 pages including drawing.*

* cited by examiner

Primary Examiner—Michael J. Carone
Assistant Examiner—Bret Hayes
(74) Attorney, Agent, or Firm—Patents+TMS, P.C.

(57) ABSTRACT

An apparatus and a method for restraining an animal and/or washing and/or grooming an animal are provided. The animal is placed on the lid of a container to allow a person to wash and/or groom the animal. The container may also store materials used in restraining and/or washing and/or grooming the animal. During use, water and/or other cleaning fluids used in washing and/or grooming of the animal exit through a drain and/or numerous holes on the surface of the lid of the container and enter an interior of the container. The container may further trap hair, fur and/or other materials removed from the animal within the interior of the container.

20 Claims, 4 Drawing Sheets

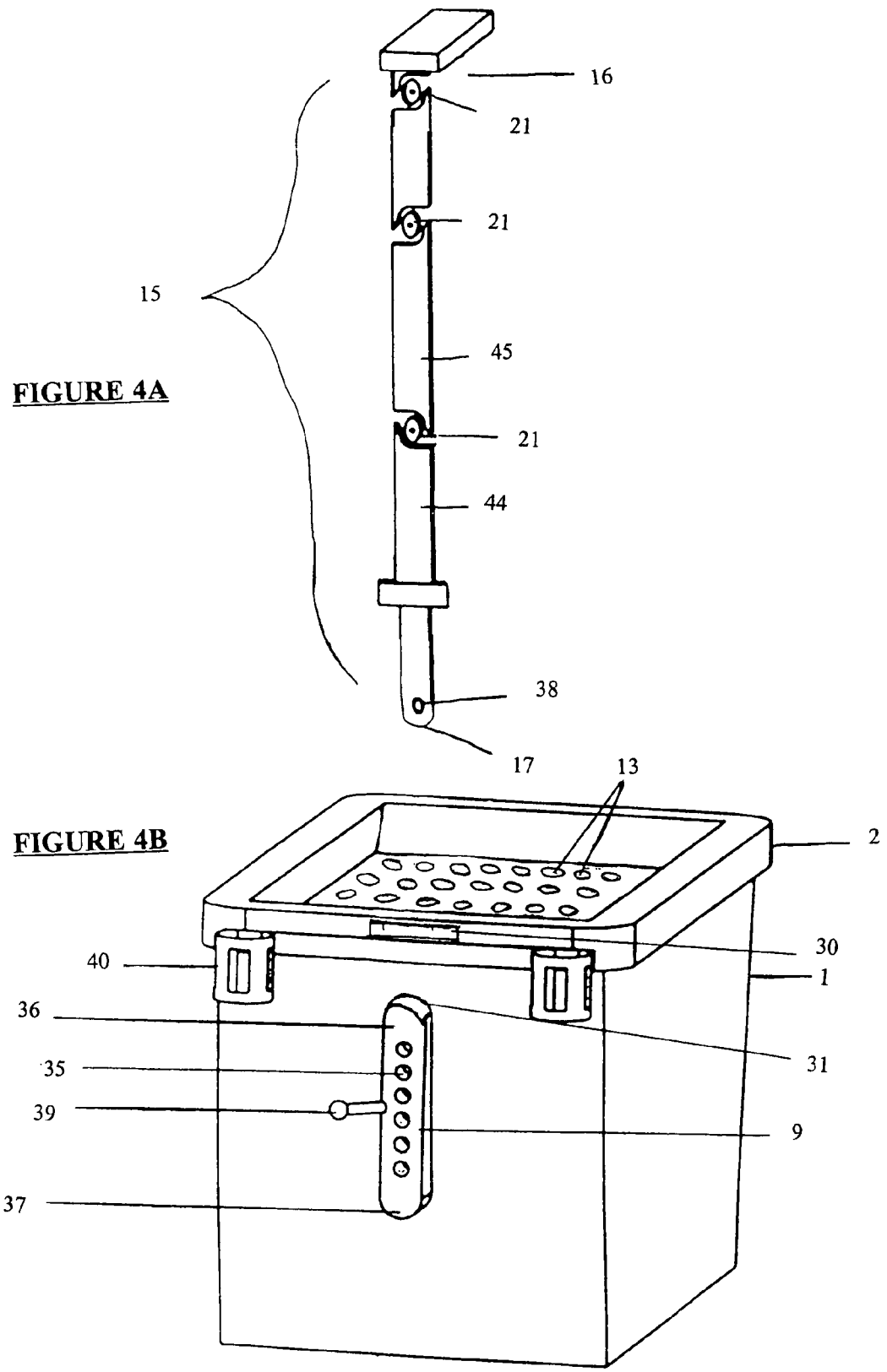

APPARATUS AND A METHOD FOR RESTRAINING AN ANIMAL DURING WASHING AND/OR GROOMING OF THE ANIMAL

BACKGROUND OF THE INVENTION

The present invention generally relates to an apparatus and a method for restraining an animal during washing and/or grooming of the animal. More specifically, the present invention relates to a container that converts from a storage bin into a tub used for washing and/or grooming of the animal. In addition, the apparatus relates to a container which traps, for example, hair, fur and other materials removed from the animal during washing and/or grooming.

Animals, for example, cats or dogs, may require washing and/or grooming for hygiene and/or health reasons. A domestic pet may typically be washed at home in, for example, a bathtub, a shower or a sink. Often the pet may resist the washing and/or grooming. As a result, the washing and/or grooming of the pet may be difficult and/or messy.

For example, the animal may be frightened or difficult to control during the washing and/or grooming. Further, the animal may, for example, attempt to escape from the area in which the animal is being washed and/or groomed. As a result, materials, such as, hair and/or fur may be spread by the animal when the animal struggles and/or escapes during washing and/or grooming.

Further, materials removed from the animal, for example, hair and/or fur may be spread throughout the area in which the animal is being washed and/or groomed even if the animal is not struggling or attempting to escape. Hair removed from the animal often causes a drain on, for example, the bathtub, to become clogged.

Various devices, systems and methods are known to wash and/or groom animals. However, known devices are difficult to use, do not adequately restrain the animal, are often large and cumbersome and fail to prevent and/or eliminate clogging of, for example, a drain to a bathtub due to the amount of hair removed from the animal during the washing and/or grooming of the animal. In addition, known devices often create a mess during their use making it difficult and/or burdensome to wash and/or groom the animal. Known devices also fail to raise the animal to a position high enough to simplify washing and/or grooming of the animal, particularly, when washing of the animal takes place in, for example, a bathtub.

A need, therefore, exists for an improved apparatus and a method for restraining an animal, for example, a cat or a dog, during washing and/or grooming of the animal. Additionally, a need exists for an improved apparatus and a method for washing and/or grooming an animal in a clean and efficient manner. More specifically, the animal may be washed and/or groomed while trapping, for example, hair and/or fur inside the apparatus.

SUMMARY OF THE INVENTION

The present invention generally relates to an apparatus and a method for restraining an animal during washing and/or grooming of the animal. Further, the present invention provides an apparatus and a method for washing and/or grooming an animal wherein the apparatus may have a lid having a drain. Still further, the present invention provides an apparatus and a method for washing and/or grooming an animal wherein the apparatus may have a restraining device. Still further, the present invention provides an apparatus and a method for washing and/or grooming an animal wherein the apparatus may store materials.

To this end, in an embodiment, an apparatus is provided. The apparatus has a container having walls defining an interior wherein a first drain defined by an opening is formed in one of the walls of the container. Further, a lid covering the interior of the container is provided. The container further has a second drain defined by an opening on the lid wherein the lid is removable to provide access to the interior of the container.

In an embodiment, the apparatus has a screen covering the opening of the first drain.

In an embodiment, the apparatus has a screen covering the opening of the second drain.

In an embodiment, the second drain of the apparatus is defined by plurality of openings on the lid.

In an embodiment, the second drain is recessed to extend into the interior of the container.

In another embodiment, the apparatus has a container having walls defining an interior and a lid covering the interior of the container. Further, the container has a restraining bar attached to the container wherein the restraining bar extends to an elongated first position and collapses to a shortened second position. The container further has a hinge on the restraining bar wherein the hinge converts the restraining bar from the first position to the second position.

In an embodiment, a hole is provided wherein the hole is defined by an opening on the restraining bar.

In an embodiment, a bracket is provided wherein the bracket is attached to one of the walls of the container wherein the bracket has an opening that receives the restraining bar.

In an embodiment, a drain is provided wherein the drain is defined by an opening on the lid.

In an embodiment, a drain is provided wherein the drain is defined by an opening in one of the walls of the container.

In an embodiment, an opening is provided in one of the walls of the container having a screen restricting flow through the opening.

In an embodiment, a screen is provided wherein the screen is defined by a plane having dimensions to cover the interior of the container between the lid and the interior of the container.

In an embodiment, a holding device is provided wherein the holding device is secured to one of the walls of the container.

In an embodiment, a strap is attached to the restraining bar.

In another embodiment, a method for washing and/or grooming an animal is provided. The method has the steps of: providing a container having walls defining an interior wherein the interior is enclosed by a lid wherein the lid has a first drain; placing the animal on the lid of the container; and cleaning the animal with the cleaning fluid such that the cleaning fluid flows through the drain on the lid into the interior of the container.

In an embodiment, the method includes the step of: draining the fluid from the interior of the container by a second drain.

In an embodiment, the method includes the step of: securing the animal on the lid of the container.

In an embodiment, the method includes the step of: adjusting the container to accommodate animals of different sizes.

In an embodiment, the method includes the step of: restricting flow of the cleaning material through the lid with a screen between the lid and the interior of the container.

In an embodiment, the method includes the step of: storing materials used to clean the animal at a point exterior to the interior of the container and attached to the container.

It is, therefore, an advantage of the present invention to provide an apparatus and a method for cleaning an animal which stores materials needed to restrain an animal while washing and/or grooming.

A further advantage of the present invention to provide an apparatus and a method for cleaning an animal which is light-weight.

A further advantage of the present invention to provide an apparatus and a method for cleaning an animal which may be used in a bathtub.

A still further advantage of the present invention is to provide an apparatus and a method for cleaning an animal which has a basket for storing washing and/or grooming supplies.

Yet another advantage of the present invention is to provide an apparatus and a method for cleaning an animal wherein the apparatus has a restraining bar which may be rotated from a first position to a second position.

A still further advantage of the present invention is to provide an apparatus and a method cleaning an animal which traps, for example, fur, hair and/or other materials removed from the animal inside the container.

Moreover, an advantage of the present invention is to provide an apparatus and a method cleaning an animal which allows water and/or cleaning fluids, for example, shampoos, to drain from the container.

Yet another advantage of the present invention is to provide an apparatus and a method cleaning an animal wherein grooming materials may be stored in the apparatus.

A still further advantage of the present invention is to provide an apparatus and a method cleaning an animal wherein the apparatus may be converted from a storage container into a container on which the animal is washed and/or groomed.

A still further advantage of the present invention is to provide an apparatus and a method cleaning an animal which may eliminate the need of a person to kneel and/or bend over while washing and/or grooming the animal.

Additional features and advantages of the present invention are described in, and will be apparent from, the detailed description of the presently preferred embodiments and from the drawings.

BRIEF DESCRIPTION OF THE DRAWINGS

FIG. 4A illustrates a perspective view of a restraining bar in an embodiment of the present invention.

FIG. 4B illustrates a perspective side view of the container in an embodiment of the present invention.

DETAILED DESCRIPTION OF THE PRESENTLY PREFERRED EMBODIMENTS

The present invention generally relates to an apparatus and a method for restraining an animal during washing and/or grooming of the animal. More specifically, the present invention provides a container that stores washing and/or grooming materials. The container may be a tub on which the animal may be washed and/or groomed.

Figure 1:
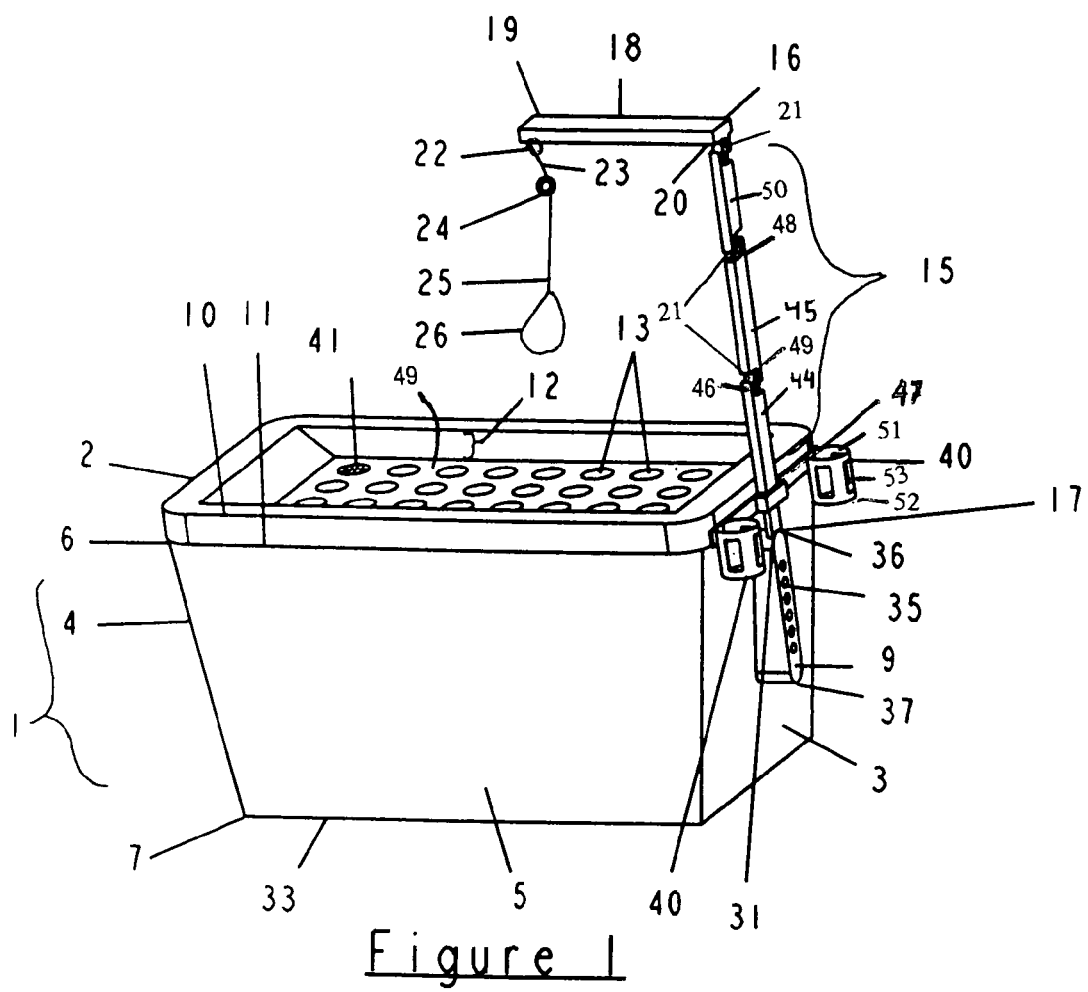
FIG. 1 illustrates a perspective view of an embodiment of a container of the present invention for washing and/or grooming an animal.
Figure 2:
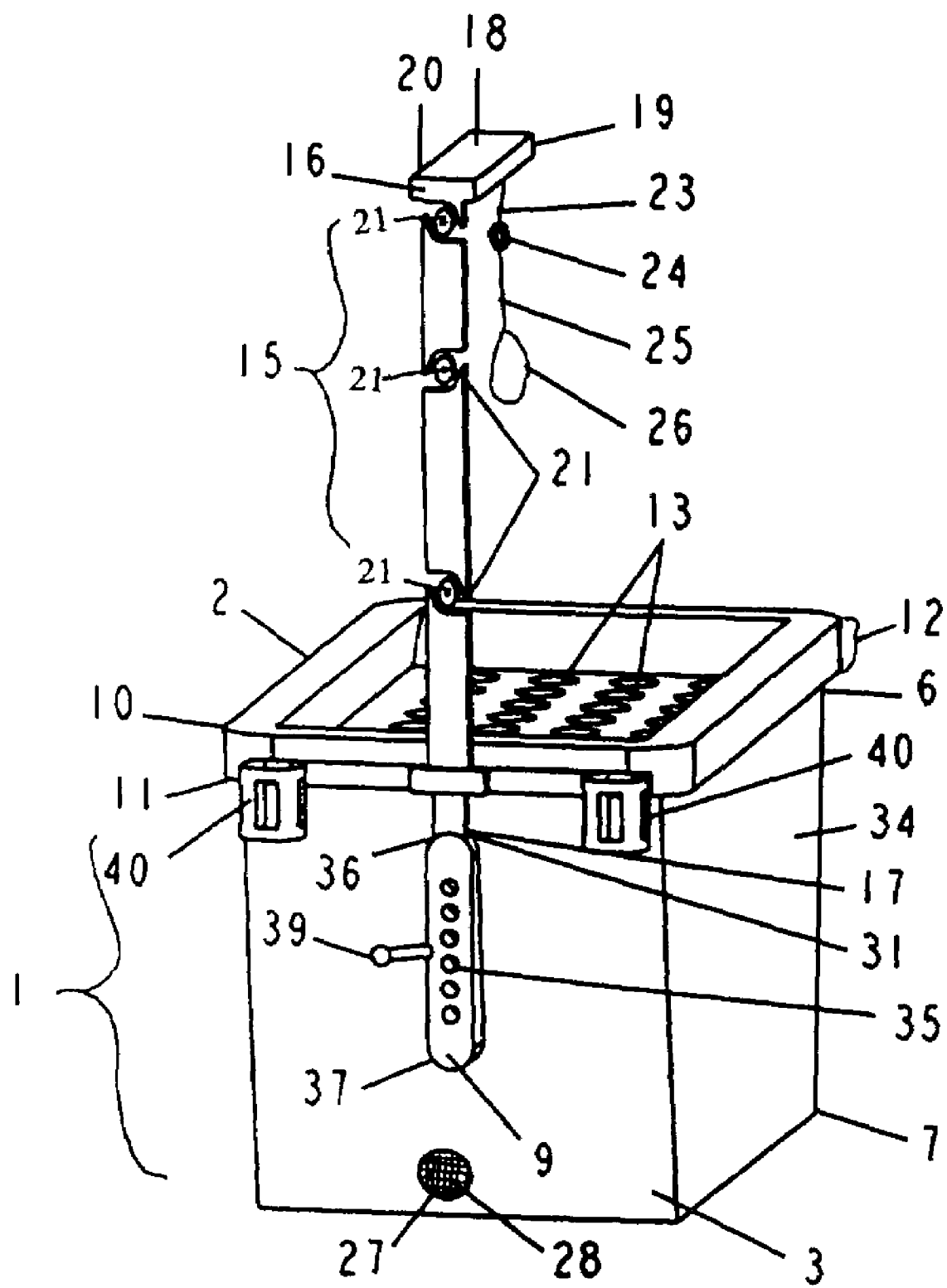
FIG. 2 illustrates a perspective side view of a second end of an embodiment of a container of the present invention.
Figure 3:
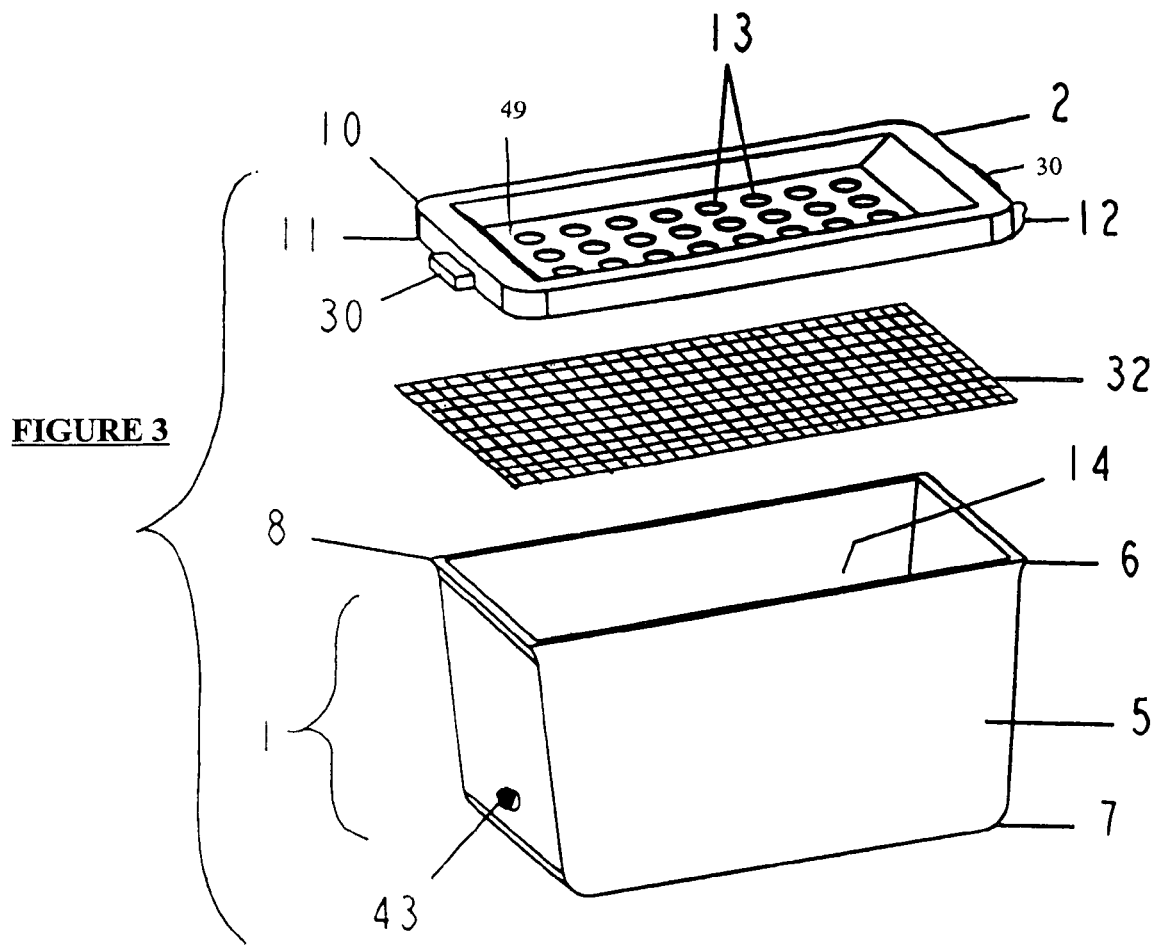
FIG. 3 illustrates an exploded front perspective view of an embodiment of a container of the present invention.

Referring now to the drawings wherein like numerals refer to like parts, FIG. 1 illustrates a container 1 having a lid 2, a front end 3, a back end 4, a first side 5, a second side 34 (as shown in FIG. 2) and a bottom 33. The container 1 may also have a lip 8 (as shown in FIG. 3) and an adjuster 9. The container 1 may further have a first end 6 and a second end 7. The lip 8 may be provided at the first end 6 of the container 1.

The container 1 may be made from, for example, plastic, metal or wood. Preferably, the container 1 is rectangular in shape; however, the container 1 may be cubic, spherical or any other shape.

During the washing and/or grooming of the animal, the container 1 may be placed within, for example, a bathtub, a shower or a sink. The container 1 may also be used, for example, on the lawn utilizing a garden hose. During washing and/or grooming, the lid 2 may be placed on the container 1. An animal, such as, for example, a cat or a dog, may be placed on a top side 49 of the lid 2. If the animal is being washed in the shower and/or bathtub, a shower head (not shown) or adjustable sprayer (not shown) may supply the water for washing the animal. Further, the animal may be washed with, for example, shampoos and/or conditioners.

Placing the animal on the lid 2 of the container 1 may elevate the animal. After the animal is elevated on the lid 2, the person may be able to wash and/or groom the animal without, for example, bending over. Placing the animal on the lid 2 may also allow the person to avoid kneeling in an uncomfortable position while washing and/or grooming the animal. More specifically, the person may not need to kneel in an uncomfortable position, for example, to reach the animal standing on the bottom of, for example, the bathtub. The person may not experience pain in, for example, the knees and/or back while washing and/or grooming the animal as a result of the person not needing to, for example, kneel and/or bend over.

The lid 2 of the container 1 may have a first end 10 and a second end 11. The lid 2 may be removable from the container 1 by, for example, a handle 30 (as shown in FIGS. 3 and 4B). Preferably, more than one handle 30 may be provided on the lid 2. Further, a raised edge 12 may be provided on the lid 2. During the washing and/or grooming of the animal, liquids, for example, water, shampoos and/or conditioners, may accumulate on the lid 2 of the container 1.

The second end 11 of the lid 2 may have a hole 13. FIG. 1 illustrates many holes 13 on the second end 11 of the lid 2. More specifically, the lid 2 may have one or more rows of holes 13 spaced as generally illustrated and extending through the lid 2. The holes 13 may allow water and/or cleaning fluids to drain from the lid 2 into an interior 14 of the container 1 (as shown in FIG. 3).

The holes 13 on the lid 2 may each have an individual screen 41. The screen 41 may prevent materials, for example, fur and/or hair removed from the animal, from entering the holes 13 on the lid 2 and falling into the interior 14 of the container 1. The screen 41 may further prevent, for example, hair, fur and/or any other material removed from the animal from draining into the holes 13 on the lid 2 while allowing, for example, the water to drain through the holes 13 on the lid 2.

The washing and/or grooming apparatus may have a restraining bar 15 which may have a first end 16 and a second end 17. The first end 16 of the restraining bar 15 may be attached to a shaft 18. Further, the second end 17 of the restraining bar 15 may have a hole 38 as shown in FIG. 4A. The shaft 18 may have a first end 19 and a second end 20. The second end 20 of the shaft 18 may be attached to the first end 16 of the restraining bar 15.

The restraining bar 15 may further have a locking hinge 21. The locking hinge 21 may pivotably secure a first section 44 of the restraining bar 15 to a second section 45 of the restraining bar 15. The first section 44 of the restraining bar 15 may have a first end 46 and a second end 47. The second section 45 of the restraining bar 15 may have a first end 48 and a second end 49.

The locking hinge 21 may further pivotably secure the second section 45 of the restraining bar 15 to a third section 50. Still further, the locking hinge 21 may pivotably secure the third section 50 of the restraining bar 15 to the shaft 18. The locking hinge 21 may enable the restraining bar 15 to be secured in, for example, a first position or a second position.

The first position may be, for example, generally straight. More specifically, the second end 47 of the first section 44 may be located distal from the first end 48 of the second section 45. As a result, the first section 44 and the second section 45 may line up end-to-end to form the generally straight position. Alternatively, the first end 48 of the second section 45 may be rotated next to the second end 47 of the first section 44 forming a generally stacked position. More specifically, the first section 44 may be rotated around a pivot pin and may be placed next to the second section 45. Further, the second position may be, for example, shorter in length than the first position. The person may secure the restraining bar 15 in the second position, for example, to reduce the size of the restraining bar 15, for example, for storage. FIGS. 1, 2, 4A and 4B illustrate the restraining bar 15 in the first position.

The locking hinge 21 may further have, for example, a knob and/or a releasably locking stopper. The pivot pin may be located between the first section 44 of the restraining bar 15 and the second section 45 of the restraining bar 15. Further, the pivot pin may be a point of rotation for the first section 44 of the restraining bar 15 and the second section 45 of the restraining bar 15.

The pivot pin may be attached to the knob. Still further, the knob may be attached to the releasably locking stopper. The person may twist the knob on the locking hinges 21 to either secure the restraining bar 15 in the first position or to secure the restraining bar 15 in the second position.

Preferably, more than one locking hinge 21 may be provided on the restraining bar 15. More specifically, more than one locking hinge 21 may be provided on the restraining bar 15 so that the restraining bar 15 may be folded numerous times to a smaller size. Further, the restraining bar 15 may have any number of sections. FIG. 1 illustrates the restraining bar 15 having three locking hinges 21, the first section 44, the second section 45 and the third section 50. The restraining bar 15 may be placed into the interior 14 of the container 1, for example, after the restraining bar is secured in the second position. Further, the restraining bar 15 may be placed within the interior 14 of the container 1 when the restraining bar 15 is secured in the first position.

A first ring 22 may be attached to the first end 19 of the shaft 18. A strap 23 may attach the first ring 22 to a second ring 24. The second ring 24 may receive an animal leash for securing an animal. More specifically, the animal leash may be, for example, tied to the second ring 24 or may be secured to the second ring 24 by, for example, a snap hook. Further, the animal may be placed in the leash, for example, prior to washing and/or grooming.

Further, a tethering device 25 may be attached to the second ring 24, and a noose 26 may be located on the tethering device 25. The noose 26 may be placed around, for example, a neck of the animal during washing and/or grooming. The noose 26 may secure the animal in place on the lid 2 while, for example, the animal is washed and/or groomed. More specifically, the noose 26 may restrict the movement of the animal. Of course, depending on the animal, washing and/or grooming of the animal may be effected on the lid 2 of the container 1 without securing the animal by the noose 26.

Referring now to FIG. 2, a drain 27 may be located on, for example, the front end 3, the back end 4, the first side 5 and/or the second side 34 of the container 1. While the animal is being washed and/or groomed, materials, for example, water, shampoos, conditioners, fur and/or hair or the like, may accumulate in the interior 14 of the container 1. The drain 27 may allow, for example, the water, shampoos, conditioners, fur and/or hair to drain from the interior 14 of the container 1.

The drain 27 may further have a drain hole screen 28. The drain hole screen 28 may prevent, for example, the hair, fur and/or any other material removed from the animal from draining through the drain 27 of the container 1 while allowing, for example, the water to drain from the drain 27. More specifically, the hair, fur and/or any other materials removed from the animal may be trapped within the interior 14 of the container 1 if the drain hole screen 28 is provided on the drain 27.

Collecting the hair, fur and/or any other materials removed from the animal within the interior 14 of the container 1 may prevent the location, for example, a bathtub, from clogging. Further, collecting the hair, fur and/or any other materials removed from the animal within the interior 14 of the container 1 may reduce the time required to clean, for example, the bath tub after washing and/or grooming the animal.

Also referring to FIG. 2, the adjuster 9 may be on the front end 3 of the container 1. The adjuster 9 may have a first end 36 and a second end 37. Further, the adjuster 9 may have a hole 35 through which a pin 39 may be inserted. More than one hole 35 may be provided on the adjuster 9. FIG. 2 illustrates the adjuster 9 having six holes 35. Still further, an opening 31 may be located at the first end 36 of the adjuster 9 for receiving the restraining bar 15.

The second end 17 of the restraining bar 15 may be inserted into the opening 31 of the adjuster 9. The hole 35 in the adjuster 9 may be, for example, aligned with the hole 38 on the second end 17 of the restraining bar 15. After the hole 35 in the adjuster 9 is aligned with the hole 38 in the second end 17 of the restraining bar 15, the pin 39 may be inserted into the hole 35 in the adjuster 9 and the hole 38 in the second end 17 of the restraining bar 15. More specifically, the pin 39 may be inserted through the hole 35 in the adjuster 9 and the hole 38 in the second end 17 of the restraining bar 15. As a result, the pin 39 restricts movement of the restraining bar 15.

Further, the restraining bar 15 may be raised or lowered to align with any of the holes 35 on the adjuster 9. For example, if the person is washing and/or grooming a tall or large animal, the restraining bar 15 may need to be higher. The person may, for example, lift the restraining bar 15 so that the hole 38 on the second end 17 of the restraining bar 15 aligns with one of the holes 35 near the first end 36 of the adjuster 9.

In the alternative, if the person is, for example, washing and/or grooming a short or small animal, the person may lower the restraining bar 15 so that the hole 38 of the restraining bar 15 aligns with one of the holes 35 near the second end 37 of the adjuster 9. Of course, the animal may be washed and/or groomed without the restraining bar 15 inserted into the adjuster 9. More specifically, the animal may be washed and/or groomed on the lid 2 of the container 1 without using the restraining bar 15.

A holding device 40 may be attached to the container 1 and/or the lid 2 of the container 1. The holding device 40 may have a first end 51, a second end 52 and/or a side 53. The first end 51 of the holding device 40 may be open to, for example, place articles within the holding device 40. The holding device 40 may, for example, resemble a cup holder.

The holding device 40 may be attached to, for example, the raised edge 12 of the lid 2 or may be attached to the first end 6 of the container 1. The holding device 40 may be attached to, for example, the container 1 or the lid 2 of the container 1 by, for example, a magnet, a clamp, or other like fasteners known to those skilled in the art. The holding device 40 may hold, for example, shampoo, clippers, or the like. The holding device 40 may be removed from the raised edge 12 and/or the first end 6 of the container 1. Further, the holding device 40 may be stored within the interior 14 of the container 1 after washing and/or grooming of the animal.

Referring now to FIG. 3, the interior 14 of the container 1 may be used for storing items, for example, items related to washing and/or grooming of the animal. More specifically, the interior 14 of the container 1 may store, for example, the restraining bar 15 and/or the holding device 40 after washing and/or grooming of the animal. Further, the interior 14 of the container 1 may store, for example, towels, shampoos, brushes, blow dryers, clippers, and/or manicuring tools for washing and/or grooming of the animal. Further, the interior 14 of the container 1 may store items, for example, not related to the washing and/or grooming of animals.

Further, a single screen 32 covering all of the holes 13 may be attached to the second end 11 of the lid 2 instead of, or in addition to, the individual screens 41 on the holes 13 as previously described with reference to FIG. 1. More specifically, the single screen 32 may cover all of the holes 32 of the lid 2, whereas the individual screens 41 illustrated in FIG. 1 may only cover one hole 13. The single screen 32 may be positioned, for example, below the second end 11 of the lid 2. FIG. 3 illustrates the single screen 32 positioned in the interior 14 of the container 1 below the lid 2. The single screen 32 may prevent materials, for example, fur and/or hair removed from the animal from falling into the interior of the container 1.

A drain stopper 43 may be placed over the drain 27. The drain stopper 43 may prevent the water and/or cleaning fluids from draining from the interior 14 of the container 1 through the drain 27. For example, the person may not want, for example, the water, shampoo, conditioner, fur and/or hair to drain out of the interior 14 of the container 1. Further, the person may wish to trap, for example, the water, the cleaning fluids, the hair and/or fur or the like within the interior 14 of the container 1. The person may later transport the container 1 to an area in which the container 1 may be emptied.

After washing and/or grooming the animal, the person may disassemble the apparatus. First, if the noose 26 is being used, the animal may be released from the noose 26. The lid 2 of the container 1 may then be removed from the container 1. Any excess water and/or cleaning fluid from the interior 14 of the container 1 may be emptied from the container 1. The container 1 may also be disassembled by removing the pin 39 from the adjuster 9 and then removing the restraining bar 15 from the adjuster 9. Further, the locking hinge 21 may allow the restraining bar 15 to be rotated into the second position. After being secured in, for example, the second position, the person may place the restraining bar 15 within the interior 14 of the container 1. The person may further store, for example, the holding device 40, the pin 39, towels and/or any other materials used in the washing and/or grooming of the animal within the interior 14 of the container 1. The lid 2 may then be placed on the container 1. The container 1 with the cleaning supplies and materials in the interior 14 of the container 1 may be stored for future washing and/or grooming of the animal.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. An apparatus comprising:
   a container having a planar surface wherein the planar surface has a top side and a bottom side wherein exterior walls extend outward from the top side of the planar surface defining an interior wherein each of the exterior walls has a height defined between a first end and a second end and a length defined between a first side and a second side wherein the first end is adjacent to the planar surface and further wherein each of the exterior walls has a continuously uniform width between the first end and the second end and the first side and the second side of each of the exterior walls wherein each of the exterior walls are connected to define the interior of the container;
   a first drain in the container wherein the first drain is an opening extending into the interior of the container through only one of the walls of the container;
   a lid covering the interior of the container wherein the lid has a top side and a bottom side forming a planar surface wherein the bottom side is opposite to the top side wherein the lid has a length defined between a first side and a second side wherein the first side is adjacent to the top side and further wherein the lid has a width defined between a front end and a back end of the front side of the exterior walls wherein the exterior walls extend from the top side of the lid wherein each of the exterior walls has a distal end and a proximate end wherein the distal end is adjacent to the top side of the lid and further wherein the proximate end of one side of the exterior walls of the lid is positioned between the first end and the second end of the container; and
   a second drain defined by a plurality of openings extending through the top side of the lid wherein the plurality of openings has a first plurality of openings separated along the width of the lid and a second plurality of openings separated along the length of the lid wherein the first plurality is at least two openings and the second plurality of openings is greater than the first plurality of openings.

2. The apparatus of claim 1 further comprising:
   a screen covering the opening of the first drain.

3. The apparatus of claim 1 further comprising:
   a screen covering the opening of the second drain.

4. The apparatus of claim 1 further comprising:
a holding device secured to one of the exterior walls of the container wherein the holding device has walls defining an interior.

5. The apparatus of claim 1 wherein the planar surface of the lid is recessed to extend the planar surface into the interior of the container.

6. An apparatus comprising:
a container having a base wherein the base has a top surface and a bottom surface wherein the top surface is opposite to the bottom surface wherein the container has a length defined between a front end and a back end wherein the container has walls extending from the top surface of the base wherein the walls define an interior of the container wherein each of the walls has a height defined between a first end and a second end wherein the first end is adjacent to the top surface of the base;
a first drain in the container wherein the first drain is an opening extending into the interior of the container through one of the walls of the container;
a first screen positioned on the second end of the walls of the container wherein the first screen has a planar surface wherein the planar surface has a top side and a bottom side wherein the top side is opposite to the bottom side wherein the screen has a length defined between a distal end and a proximate end wherein the distal end of the screen is positioned on the front end of the container wherein the proximate end of the screen is positioned on the back end of the container wherein the screen has a plurality of openings extending through the first screen; and
a lid covering the interior of the container wherein the lid has a base wherein the base has a top side and a bottom side wherein the top side is opposite to the bottom side wherein a plurality of openings extend through the lid wherein the plurality of openings are uniformly spaced on the top side of the lid and further wherein the lid has exterior walls extending outward with respect to the top side of a base wherein the exterior walls have a height defined between a top end and a bottom end wherein the bottom end is adjacent to the top side of the base wherein the first screen is positioned between the plurality of openings of the lid and the second end of the walls of the container.

7. The apparatus of claim 6 further comprising:
a second screen secured to the first drain wherein the second screen has a planar surface having a plurality of openings extending through the second screen.

8. The apparatus of claim 6 further comprising:
a holding device attached to one wall of the walls of the container wherein the holding device has peripheral walls defining an interior.

9. The apparatus of claim 6 further comprising:
a handle attached to the lid wherein the hand extends from the exterior walls of the lid.

10. The apparatus of claim 6 further comprising:
a lip connected to one wall of the walls of the container wherein the lip extends outward from the one wall of the container.

11. The apparatus of claim 6 wherein the plurality of openings of the lid are larger than the plurality of openings of the screen.

12. The apparatus of claim 6 further comprising:
a plurality of second screens connected to the lid wherein one of the plurality of second screens is attached to each of the plurality of openings in the lid.

13. The apparatus of claim 6 wherein the second end of the container is located between the top end and the bottom end of the lid.

14. An apparatus comprising:
a container having peripheral walls defining an interior wherein the peripheral walls have a height defined between a first end and a second end wherein the container has a first drain defined by an opening wherein the opening is formed in one of the peripheral walls of the container wherein the opening extends into the interior of the container;
a lid positioned on the peripheral walls of the container wherein the lid has a width defined between a first end and a second end wherein the lid has a planar surface having a top side and a bottom side wherein the planar surface has a plurality of openings uniformly spaced on the top side of the planar surface wherein the plurality of openings extend through the top side of the lid wherein the lid is removable to provide access to the interior of the container; and
a plurality of first screens connected to the lid wherein each of the plurality of first screens have a top side and a bottom side wherein the top side is opposite to the bottom side wherein each of the plurality of first screens has a plurality of openings uniformly spaced on the top side of the plurality of first screens wherein each of the plurality of first screens is located between the plurality of openings of the lid and the second end of the peripheral walls of the container and further wherein one screen of the plurality of first screens is connected to each of the plurality of openings of the lid.

15. The apparatus of claim 14 further comprising:
a holding device secured to one of the peripheral walls of the container.

16. The apparatus of claim 14 further comprising:
a second screen connected to the opening of the container.

17. The apparatus of claim 14 wherein the lid has exterior walls extending from the top side of the lid.

18. The apparatus of claim 14 further comprising:
a handle connected to the lid.

19. The apparatus of claim 14 further comprising:
a lip connected to the peripheral walls of the container wherein the lip extends outward with respect to the interior of the container.

20. The apparatus of claim 14 wherein the peripheral walls removably attach to the lid between the first end and the second end of the lid.

* * * * *